(12) United States Patent
Seehoff et al.

(10) Patent No.: US 8,074,829 B2
(45) Date of Patent: Dec. 13, 2011

(54) AVOCADO SAVER

(75) Inventors: Gary S. Seehoff, Encino, CA (US); Bryan Golden, Ventura, CA (US)

(73) Assignee: Evriholder Products, LLC, Anaheim, CA (US)

( * ) Notice: Subject to any disclaimer, the term of this patent is extended or adjusted under 35 U.S.C. 154(b) by 521 days.

(21) Appl. No.: 12/046,350

(22) Filed: Mar. 11, 2008

(65) Prior Publication Data
US 2009/0166239 A1  Jul. 2, 2009

Related U.S. Application Data

(63) Continuation-in-part of application No. 29/299,434, filed on Dec. 26, 2007, now Pat. No. Des. 575,993.

(51) Int. Cl.
*B65D 81/24* (2006.01)

(52) U.S. Cl. ........ 220/757; 220/669; 220/754; 220/810; 206/493; 206/521.2

(58) Field of Classification Search .............. 206/521.2; 220/669, 757, 810
See application file for complete search history.

(56) References Cited

U.S. PATENT DOCUMENTS

| | | | |
|---|---|---|---|
| 2,687,246 A | 8/1954 | Randall | |
| 4,256,243 A * | 3/1981 | Bianchi et al. ................ | 224/244 |
| 4,605,127 A | 8/1986 | Magnussen, Jr. | |
| 2003/0098026 A1 * | 5/2003 | Saied ........................... | 128/869 |
| 2004/0118861 A1 * | 6/2004 | Bergman et al. .............. | 220/756 |
| 2005/0249850 A1 * | 11/2005 | Scalise ......................... | 426/410 |

* cited by examiner

*Primary Examiner* — Anthony Stashick
*Assistant Examiner* — Elizabeth Volz

(57) ABSTRACT

A device includes an upper portion including a pit placement portion, a lower portion including a flat bottom portion, and a retaining strap connected to the upper portion at a first connector and removably connected to a second connector. The upper portion is adapted to removably connect with a half of an avocado.

16 Claims, 8 Drawing Sheets

AVOCADO SAVER

CROSS-REFERENCE TO RELATED APPLICATION

This is a continuation-in-part of application Ser. No. 29/299,434 filed Dec. 26, 2007 now U.S. Pat. No. D.575,993.

BACKGROUND

1. Field

This invention relates to avocado protection, and more particularly to an avocado preservation and freshness saver.

2. Description of the Related Art

Many people consume avocados daily and weekly. Many of these people only use a portion of an avocado, which can usually be half of an avocado. In order to keep the remaining half of the avocado fresh, people either place the avocado in a refrigerator, which can be by itself, in a plastic bag, wrapped in plastic or in aluminum foil. These ways of preserving an avocado half has its drawbacks. Mainly, air is allowed to interact with most of the unprotected surface of the avocado allowing oxidation. This escalates the deterioration of the avocado half.

Further, the saved half of the avocado can be damaged by other items bumping into the avocado half, rolling over, etc., which also escalates deterioration by bruising and can also alter the shape of the avocado half.

SUMMARY

A device includes an upper portion including a pit placement portion, a lower portion including a flat bottom portion, and a retaining strap connected to the upper portion at a first connector and removably connected to a second connector. The upper portion is adapted to removably connect with a half of an avocado.

Another embodiment presented is an avocado holder including an avocado placement portion including a pit holder, a flat lower portion connected to the avocado placement portion, and an elastomeric retaining strap connected to the avocado placement portion. The retaining strap is adapted to hold a half of an avocado in place on the avocado placement portion.

A method includes placing a half of an avocado in an avocado storage device, stretching a retaining strap connected at a first portion of the avocado storage device over the half of an avocado, and attaching a locking portion of the retaining strap to a hook portion of the avocado storage device. The avocado storage device protects the half of avocado from oxidation.

Yet another embodiment presented is an avocado storage device including a lower portion including flat bottom, an upper portion including at least one locking portion and at least one holding portion, and a retaining strap connected to the at least one locking portion and removably connected to the at least one locking portion.

BRIEF DESCRIPTION OF THE DRAWINGS

The embodiments are illustrated by way of example, and not by way of limitation, in the Figures of the accompanying drawings and in which like reference numerals refer to similar elements and in which.

DETAILED DESCRIPTION

The invention generally relates to an avocado saver system. Referring to the figures, exemplary embodiments of the invention will now be described. The exemplary embodiments are provided to illustrate the invention and should not be construed as limiting the scope of the invention.

Figure 1:
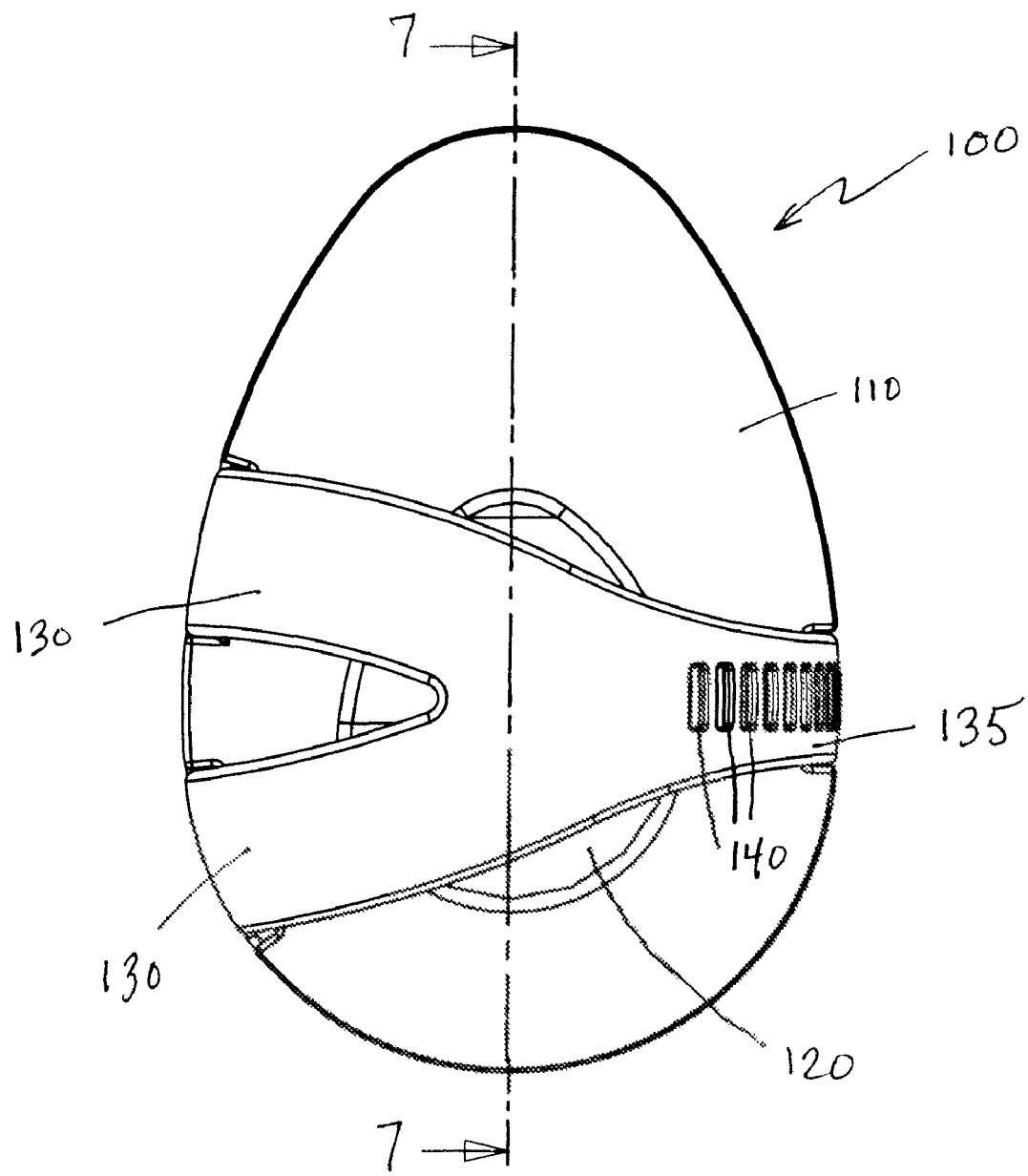
FIG. 1 illustrates a top view of an embodiment of an avocado saver.

FIG. 1 illustrates a top view of an embodiment of avocado saver 100. As illustrated, avocado saver 100 includes a top portion 110, a pit recess portion 120, anchored portions 130 of a holding strap, adjustment portion 135 of the holding strap, and locking portions 140 of the holding strap.

Figure 2:
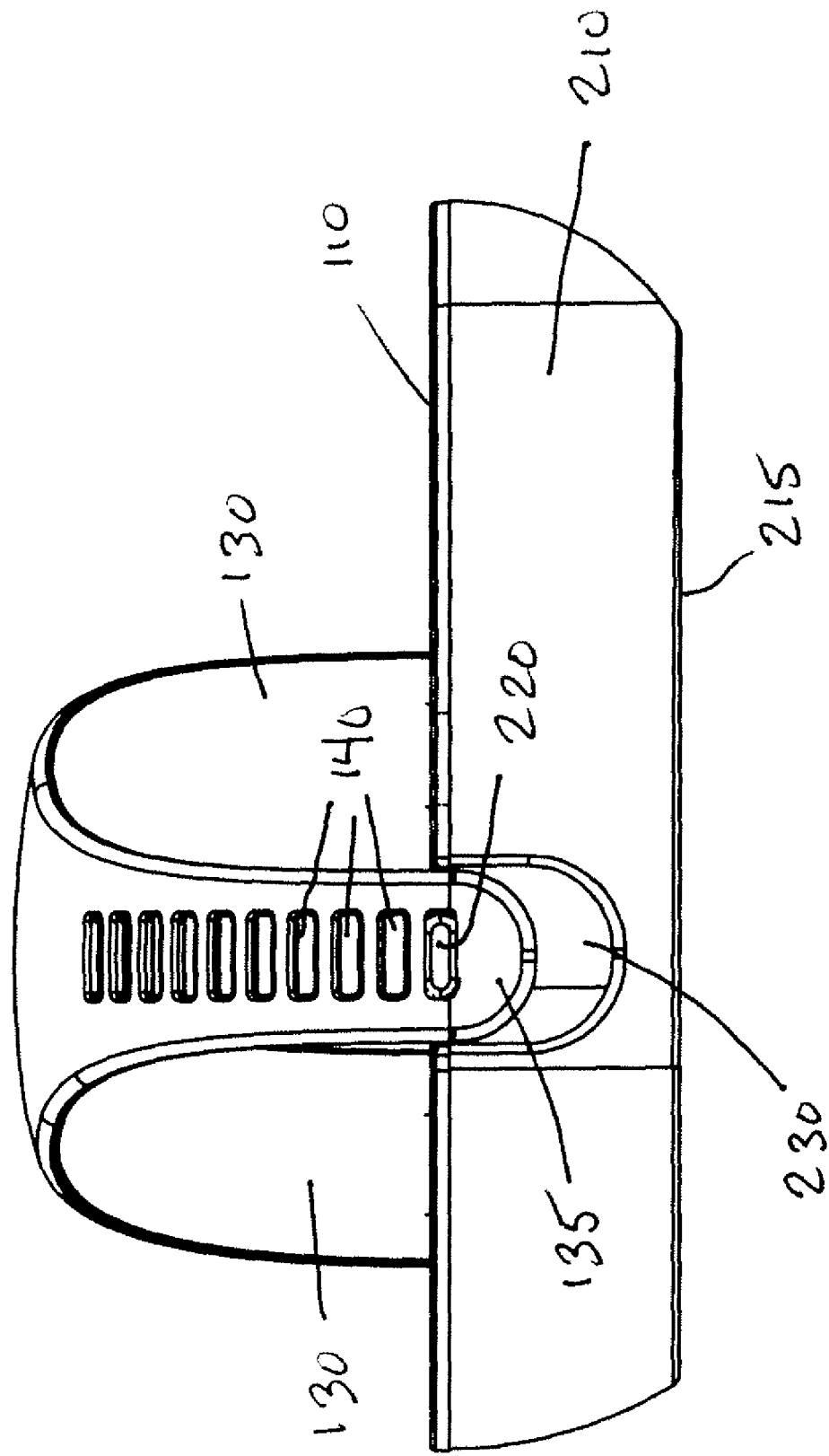
FIG. 2 illustrates a left side view of the avocado saver illustrated in FIG. 1.

FIG. 2 illustrates a left side view of avocado saver 100. As illustrated, avocado saver 100 includes an indented or cutaway portion 230 that is sized to hold the adjustment portion 135 of the holding strap so that when the adjustment portion 135 is placed in the indented portion 230, the surface of the adjustment portion 135 is flush with side portion 210. Avocado saver 100 includes a locking tab 220 within the indented portion 230 that locks the holding strap when the locking tab 220 is inserted through a locking portion 140.

Figure 3:
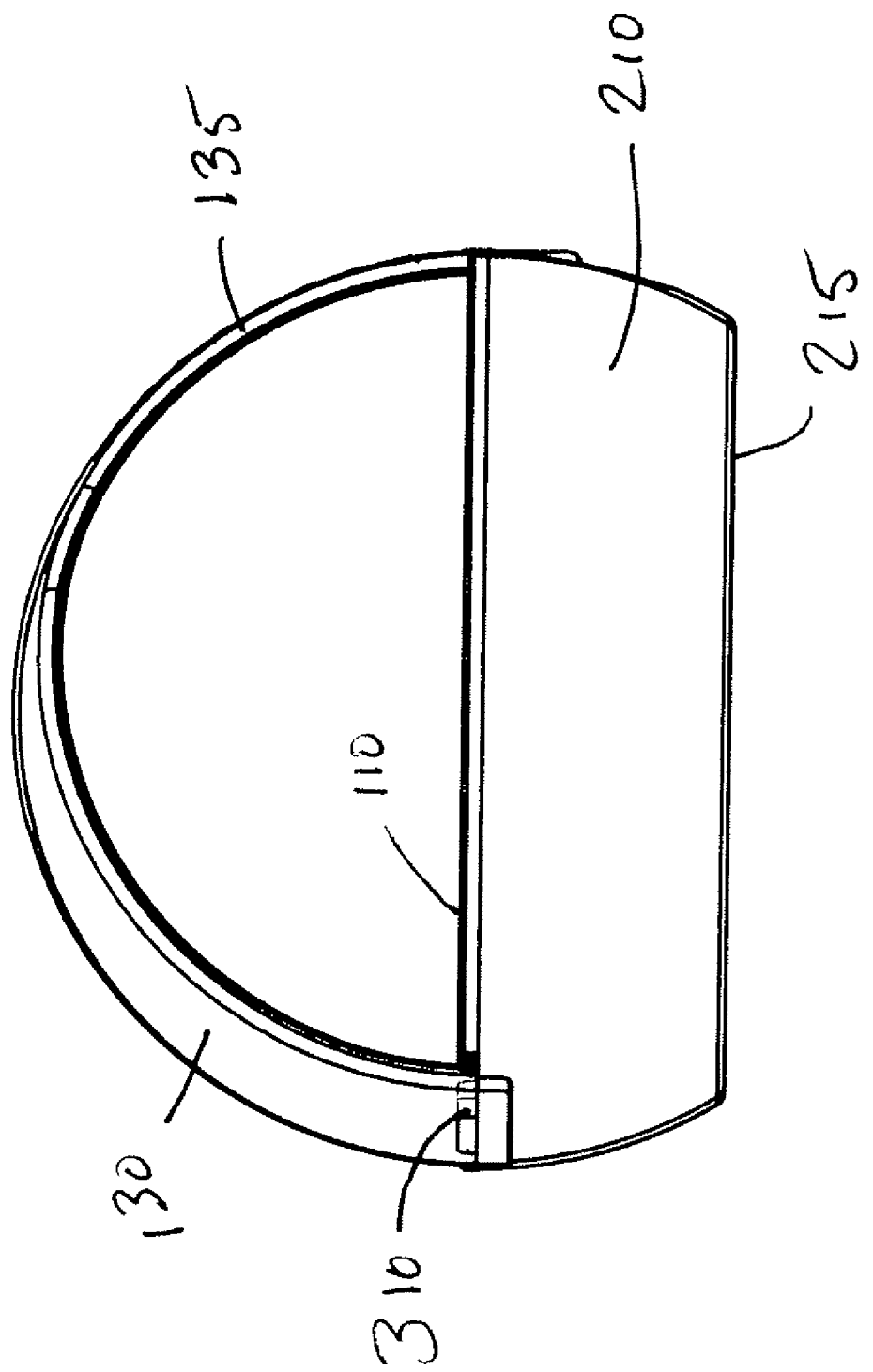
FIG. 3 illustrates a front view of the avocado saver illustrated in FIG. 1.
Figure 5:
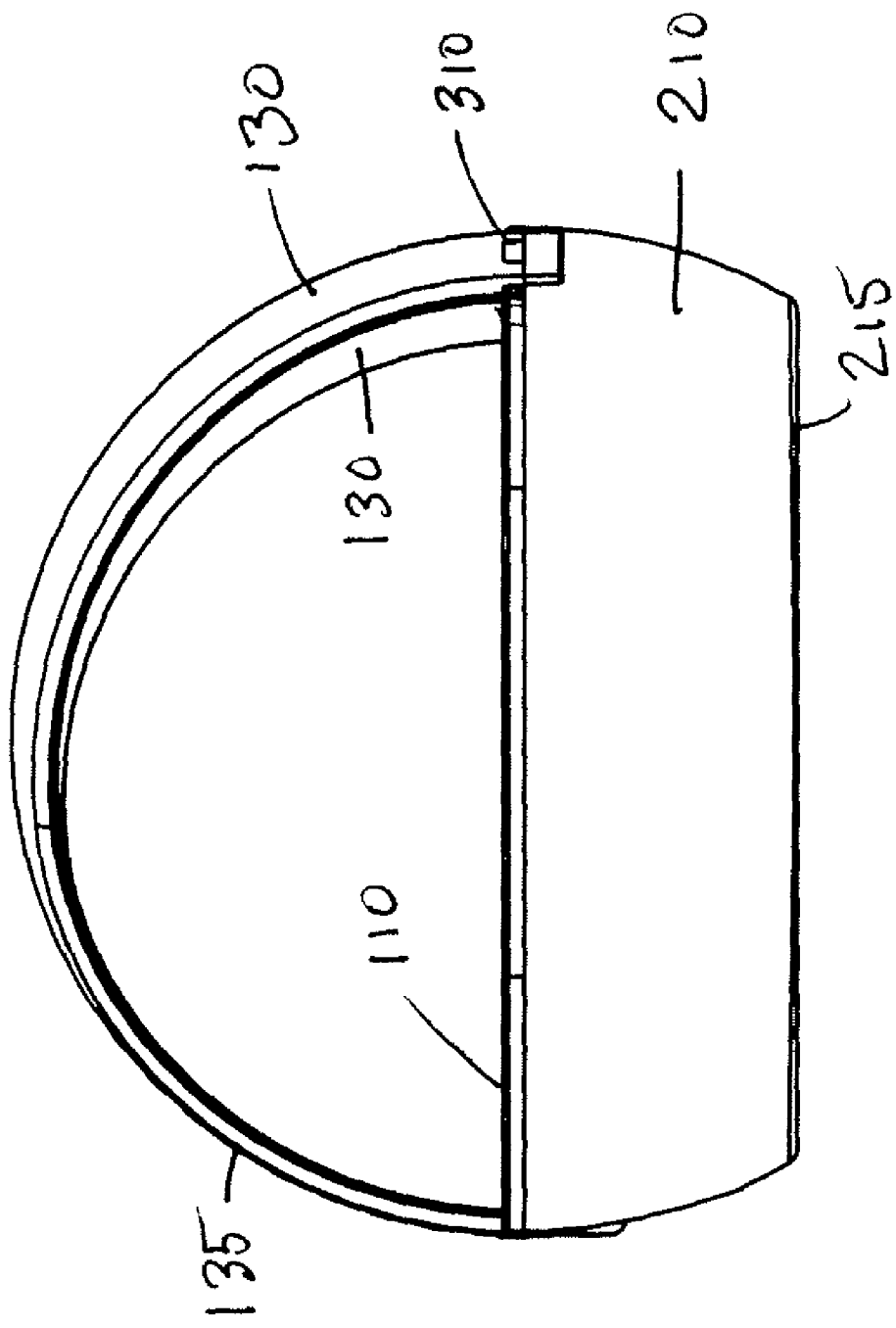
FIG. 5 illustrates a rear view of the avocado saver illustrated in FIG. 1.

FIGS. 3 and 5 illustrate front and rear views, respectively, of avocado saver 100. As illustrated, avocado saver 100 includes a flat bottom portion 215, and a locking portion 310 of anchored portions 130. Flat bottom portion 215 keeps the avocado saver from rolling, for example when placed in a refrigerator or counter.

Figure 4:
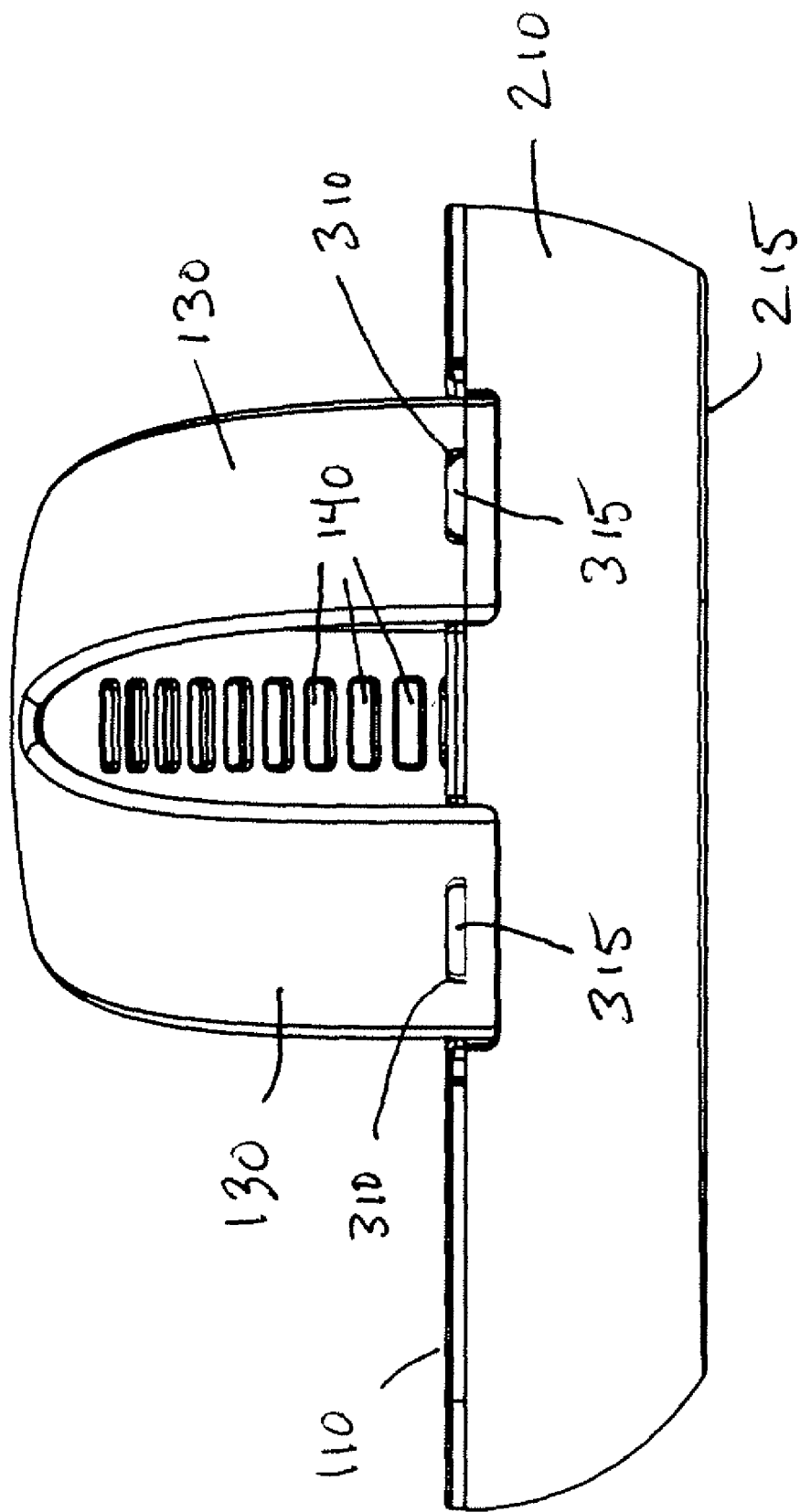
FIG. 4 illustrates a right side view of the avocado saver illustrated in FIG. 1.

FIG. 4 illustrates a right side view of avocado saver 100. Locking tabs 315 project from the side of avocado saver 100 and are received within locking portions 310 of the anchored portions 130 to anchor the holding strap to the body of the avocado saver.

Figure 6:
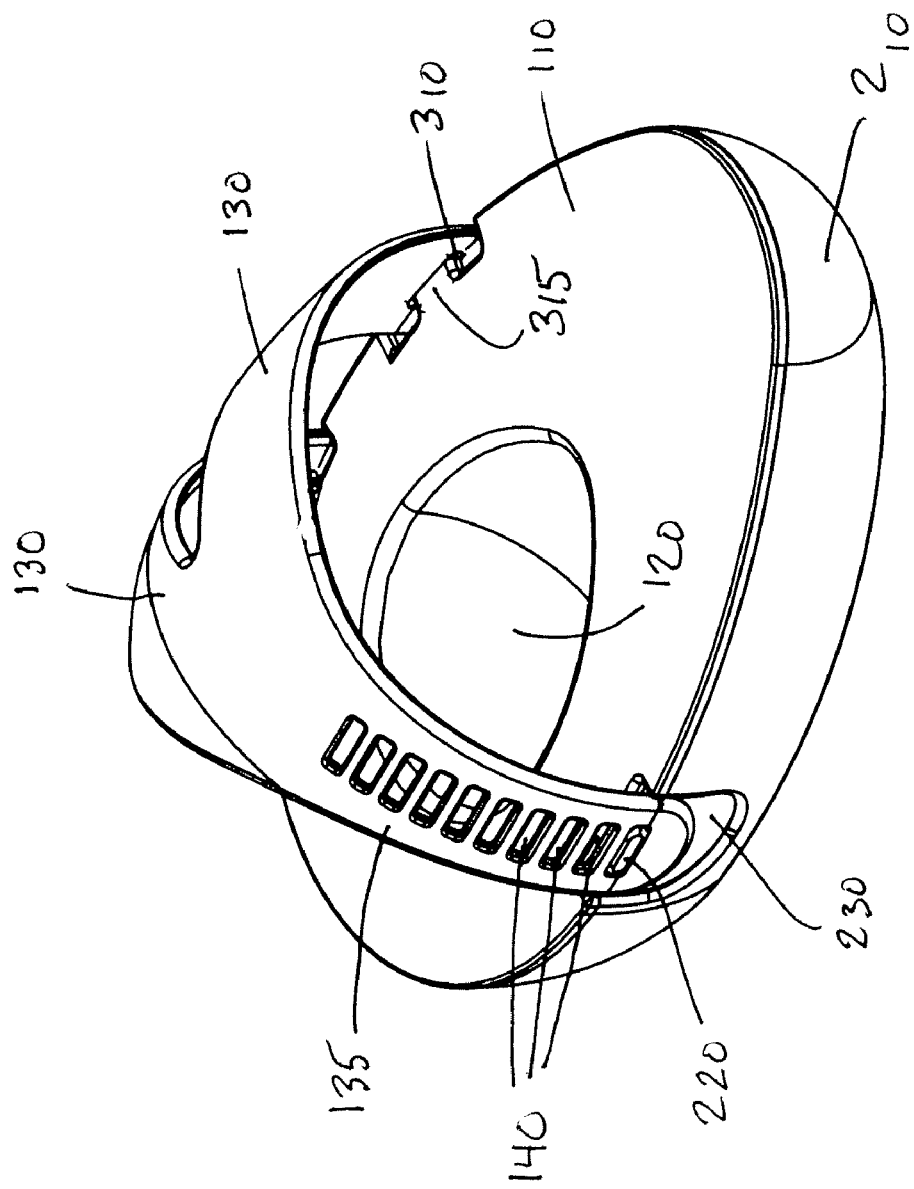
FIG. 6 illustrates a perspective view of the avocado saver illustrated in FIG. 1.
Figure 7:
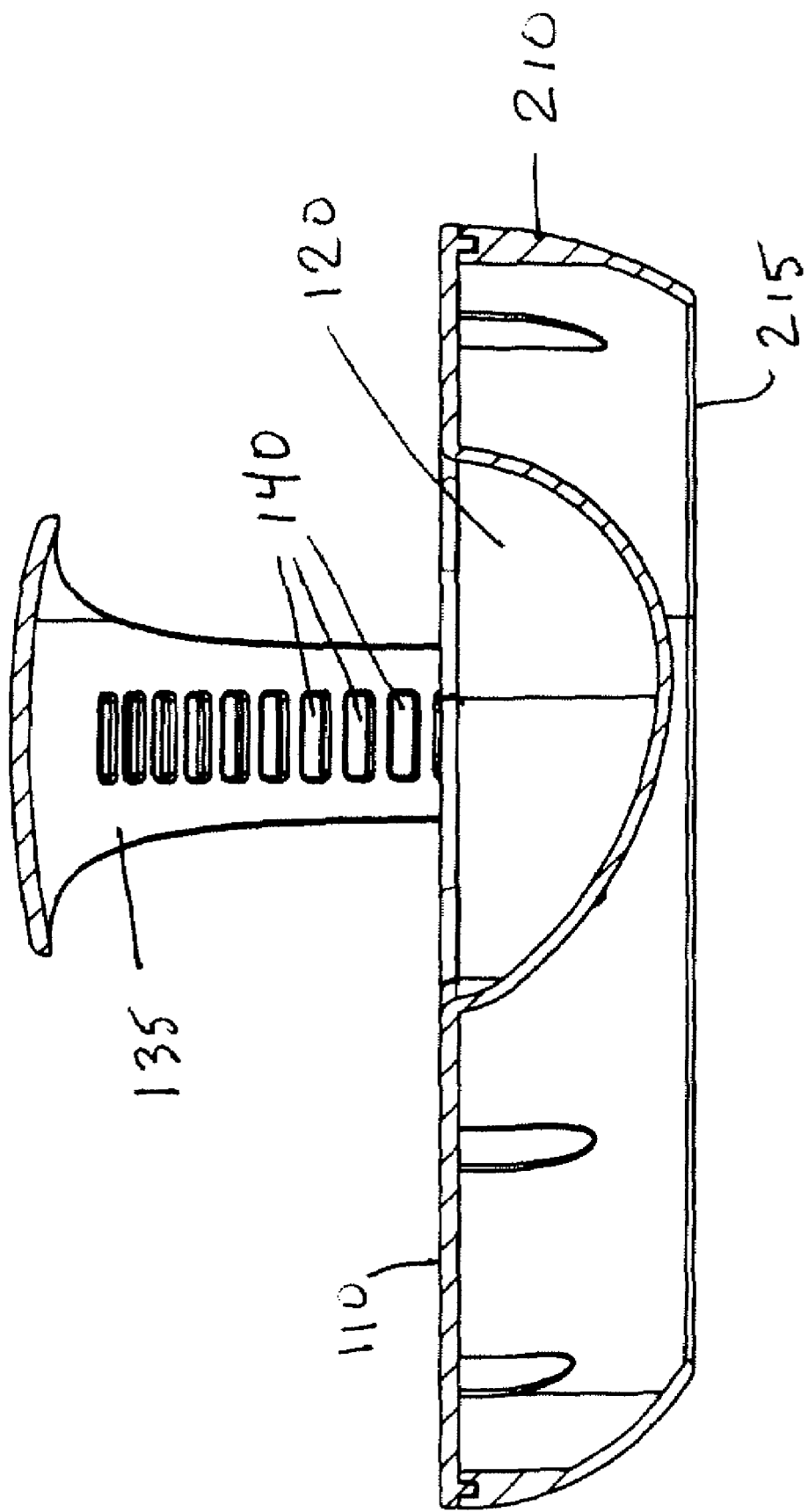
FIG. 7 is a cross-sectional view of the avocado saver through line 7-7 in FIG. 1.

FIG. 6 illustrates a perspective view of avocado saver 100 and FIG. 7 illustrates a cut-away view of avocado saver 100. Pit recess portion 120 is sized and shaped to hold the pit of an average sized avocado.

In one embodiment avocado saver 100 is manufactured using injection molded plastic. In one embodiment, the holding strap is made with TPR (thermal plastic rubber), which is stretched over half of an avocado placed in avocado saver 100 with the exposed fruit portion placed on top portion 110 with or without a pit placed in pit recess portion 120. In other embodiments, the holding strap can be made of other elastomeric material. Besides the holding strap, in one embodiment avocado saver 100 is made from injection molded plastic. In other embodiments, avocado saver 100 is made of fiberglass, wood, metal, casting resin, epoxy resin, paper/cardboard, stone, concrete, and ceramics.

Besides injection molding, in other embodiments avocado saver 100 is made from other processes or techniques, such as lay-up molding (fiberglass), metal casting, metal machining, clay or ceramic casting (Slip casting), forging, high pressure paper or laminate forming, carving(wood), plastic sheet thermo-forming fabrication, resin casting (epoxy or urethane), injection molded plastic with/without TPR co-molded components, etc. It should be noted that the various components of avocado saver 100 can each be made of different materials. It should also be noted that avocado saver 100 can be made by hand, use robotics or a combination of both.

Figure 8:
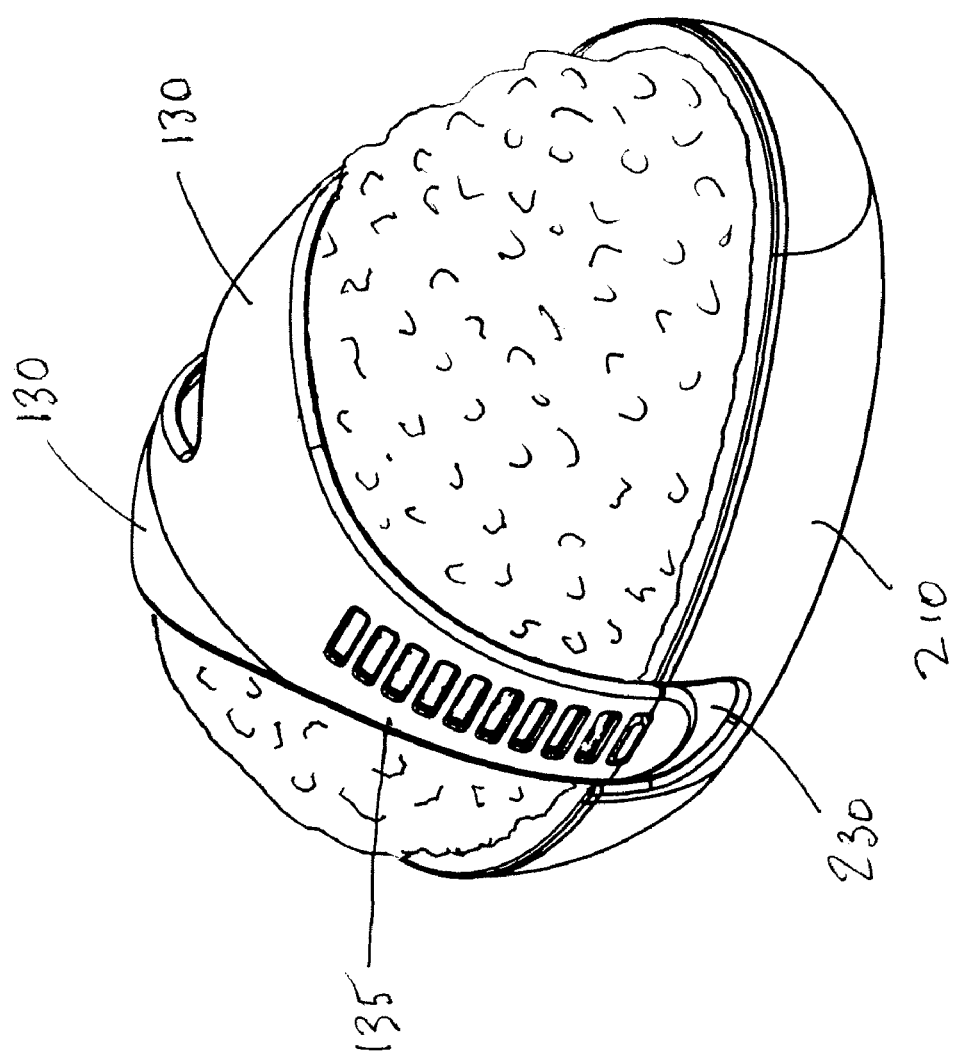
FIG. 8 illustrates a half of an avocado stored in the avocado saver illustrated in FIG. 1.

Avocado saver 100 can be made in various sizes so that many different kinds of avocados that are sized differently may be stored in avocado saver unit 100. FIG. 8 illustrates a half of an avocado placed on top of top portion 110. The holding strap is pulled over the half of an avocado to tighten the half of an avocado into place and create a substantially air tight seal between the half of an avocado and top portion 110. This formed seal prevents the half of an avocado to spoil (e.g., turn brown) to soon. As a half of an avocado is small, when stored in plastic wrap or plastic bags it can easily get indented, bumped, roll over, etc. when placed in a refrigerator. This damages the fruit of the avocado portion and hastens spoiling. When the half of an avocado is placed in avocado saver 100, the half of an avocado is protected from other items that could slide into, fall on, roll over, etc. when stored. This is a benefit over plastic bags or wrap that do not physically protect the stored avocado portion from other items.

In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
    an upper portion including a concave and recessed pit placement portion;
    a lower portion including a flat bottom portion; and
    a retaining strap coupled to the upper portion at a first connector and removably coupled to a second connector, wherein the retaining strap includes an adjustment portion including a plurality of openings that removably couple with a locking tab,
    wherein the upper portion includes a flat portion surrounding the pit placement portion and the upper portion is configured for placement of a half of an avocado.

2. The apparatus of claim 1, wherein the pit placement portion has a size and shape for holding a portion of an avocado pit and the flat portion of the upper portion supports a pit surrounding area of an avocado.

3. The apparatus of claim 1, wherein the flat bottom portion prevents rolling over of the apparatus.

4. The apparatus of claim 1, wherein the retaining strap is made of an elastomer material, and the retaining strap is secured to the upper portion with locking portions.

5. The apparatus of claim 4, further comprising locking tabs projecting from a side of the lower portion, wherein the locking tabs are received within the locking portions.

6. An avocado holder, comprising:
    an avocado placement portion including a concave and recessed pit holder;
    a flat lower portion coupled to the avocado placement portion; and
    an elastomeric retaining strap coupled to the avocado placement portion, wherein the retaining strap includes an adjustment portion including a plurality of openings that removably couple with a locking tab, and the retaining strap is adapted to hold a half of an avocado in place on the avocado placement portion.

7. The avocado holder of claim 6, wherein the retaining strap is secured to the avocado placement portion with locking portions.

8. The avocado holder of claim 6, wherein the avocado placement portion includes at least one retaining strap holding portion and a retaining strap coupling portion, and the avocado placement portion includes an indented portion that removably couples with an end of the retaining strap.

9. The avocado holder of claim 6, wherein the pit holder has a size and shape for holding a portion of an avocado pit no larger than the pit holder.

10. The avocado saver of claim 6, wherein the avocado holder is portable for placement in a refrigerator.

11. An avocado storage device comprising:
    a lower portion including a flat bottom;
    an upper portion including at least one locking portion and at least one holding portion, wherein the holding portion includes a concave and recessed pit placement portion, and
    a retaining strap coupled to the at least one locking portion and removably coupled to the at least one locking portion, wherein the retaining strap includes an adjustment portion including a plurality of openings that removably couple with a locking tab.

12. The avocado storage device of claim 11, wherein the retaining strap is made of elastomeric material.

13. The avocado storage device of claim 11, wherein the flat bottom portion prevents the avocado storage device from rolling over in a refrigerator.

14. The avocado storage device of claim 11, wherein the upper portion is sized for placement of a half of an avocado for storage in a refrigerator, and a seal is formed between avocado portions surrounding an avocado pit and a flat portion of the upper portion.

15. The avocado storage device of claim 11, wherein the upper portion includes a flat portion surrounding the pit placement portion.

16. The avocado storage device of claim 15, wherein the pit placement portion has a size and shape for holding a portion of an avocado pit.

* * * * *